UNITED STATES PATENT OFFICE.

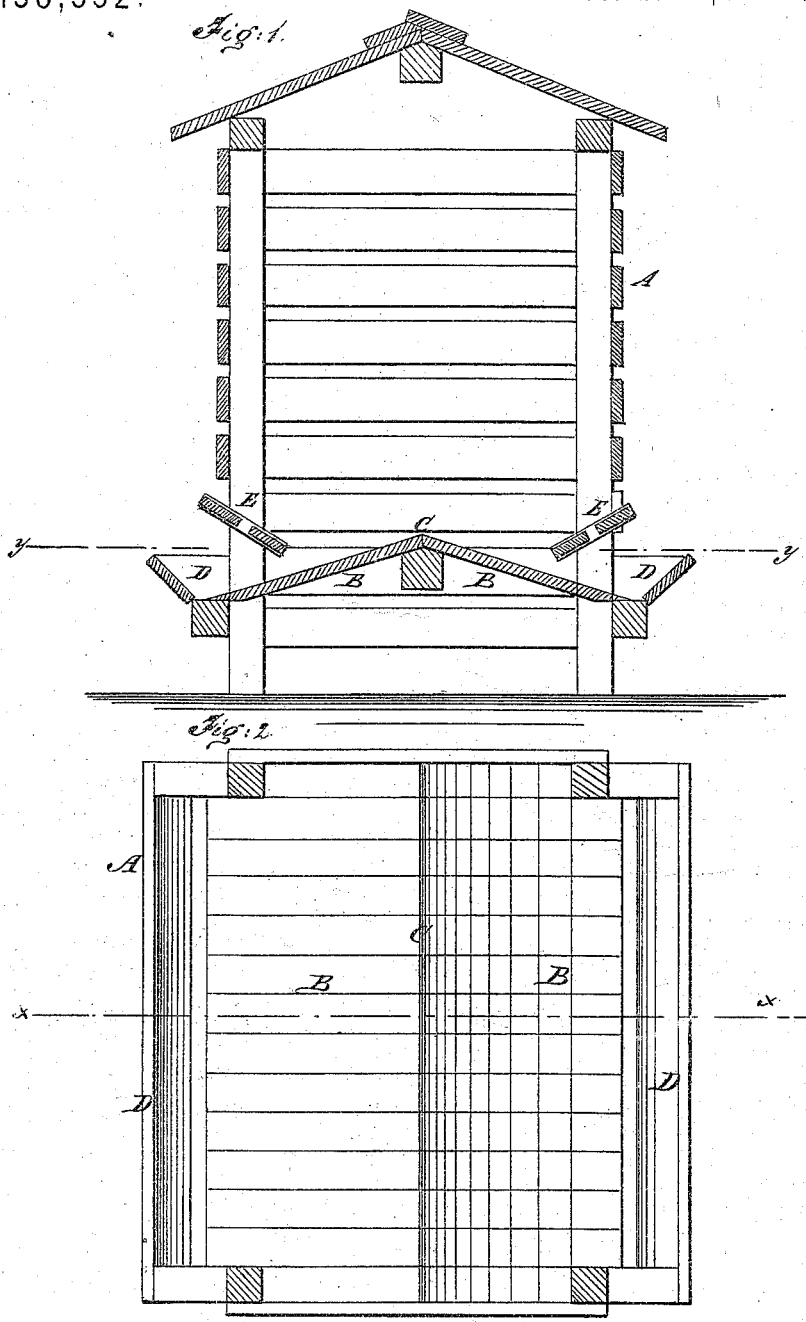

JOSEPH M. HUGHES AND ANDREW J. MAPES, OF INDEPENDENCE, MO.

IMPROVEMENT IN CORN-CRIBS.

Specification forming part of Letters Patent No. 138,332, dated April 29, 1873; application filed February 21, 1873.

*To all whom it may concern:*

Be it known that we, JOSEPH M. HUGHES and ANDREW J. MAPES, of Independence, in the county of Jackson and State of Missouri, have invented a new and useful Improvement in Self-Feeding Corn-Cribs, of which the following is a specification:

The object of this invention is to provide means for allowing the corn in the crib to be self-discharging into a trough or troughs for the feeding of stock; and it consists in the construction and arrangement hereinafter described.

In the accompanying drawing, Figure 1 is a vertical section on the line $x$ $x$ of Fig. 2. Fig. 2 is a horizontal section of Fig. 1 taken on the line $y$ $y$.

Similar letters of reference indicate corresponding parts.

A is a corn-crib having a floor, B, which inclines from the ridge C in opposite directions. This ridge runs lengthwise of the crib, and the inclination is sufficient to allow the ears of corn to slide down by their own gravity into the troughs. D D represent the troughs placed on the sides of the crib so as to receive the ends of the bottom boards. The bottom may be made with a single inclination, discharging into a single trough, if desired; or with four inclinations, discharging into a trough on each side and end; but we prefer the arrangement shown. E E are adjustable feed-bars, by means of which the quantity of corn discharged is regulated. These bars slide in angular grooves in the corner-posts of the crib, and may be adjusted so that more or less corn will slide into the troughs.

Instead of having the feed-bars slide they may be hung on pivots, so as to be adjusted by turning instead of sliding. In either case the bars may be fastened in any desired position by means of hooks and staples, or in any other suitable manner.

Having thus described our invention, we claim as new and desire to secure by Letters Patent—

1. The adjustable feed-bars E E, in combination with a corn-crib, as and for the purposes described.

2. The troughs D, (one or more,) in combination with a corn-crib and adjustable feed-bars, substantially as shown and described.

JOSEPH M. HUGHES.
ANDREW J. MAPES.

Witnesses:
J. W. SWEARINGEN,
LUCIUS CARY.